Sept. 12, 1933.  W. Y. MOBERLY  1,926,162
FISHING TACKLE BOX
Filed June 15, 1932  5 Sheets-Sheet 4
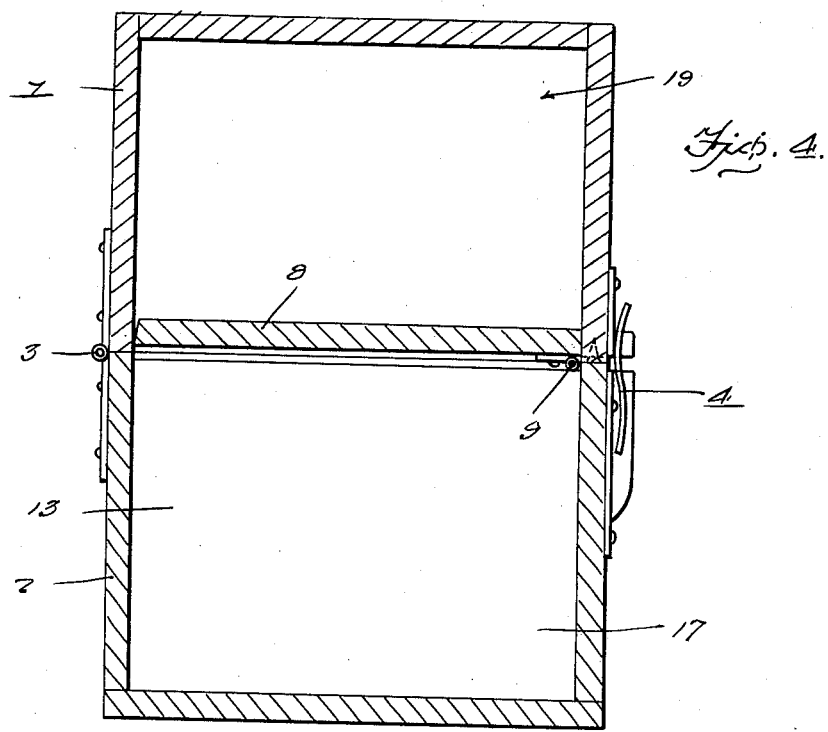
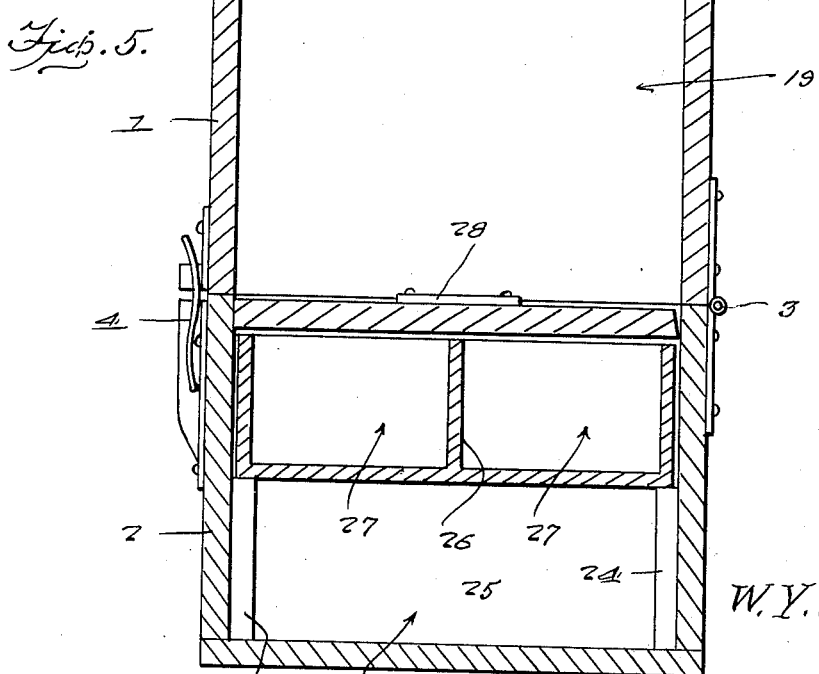
Inventor
W. Y. Moberly
By Clarence A. O'Brien
Attorney Sept. 12, 1933.　　　W. Y. MOBERLY　　　1,926,162
FISHING TACKLE BOX
Filed June 15, 1932　　　5 Sheets-Sheet 5
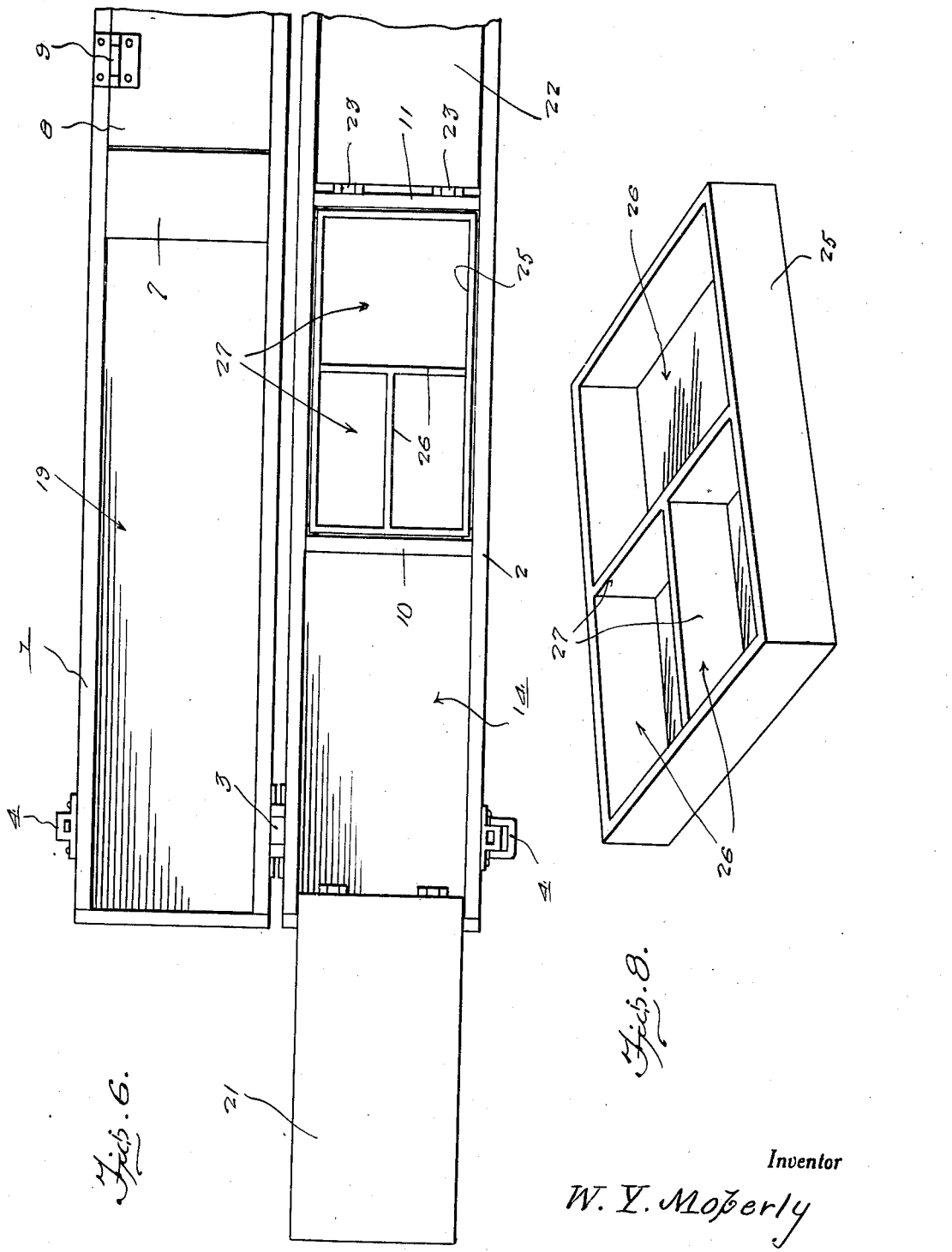
Inventor
W. Y. Moberly
By Clarence A. O'Brien
Attorney Patented Sept. 12, 1933

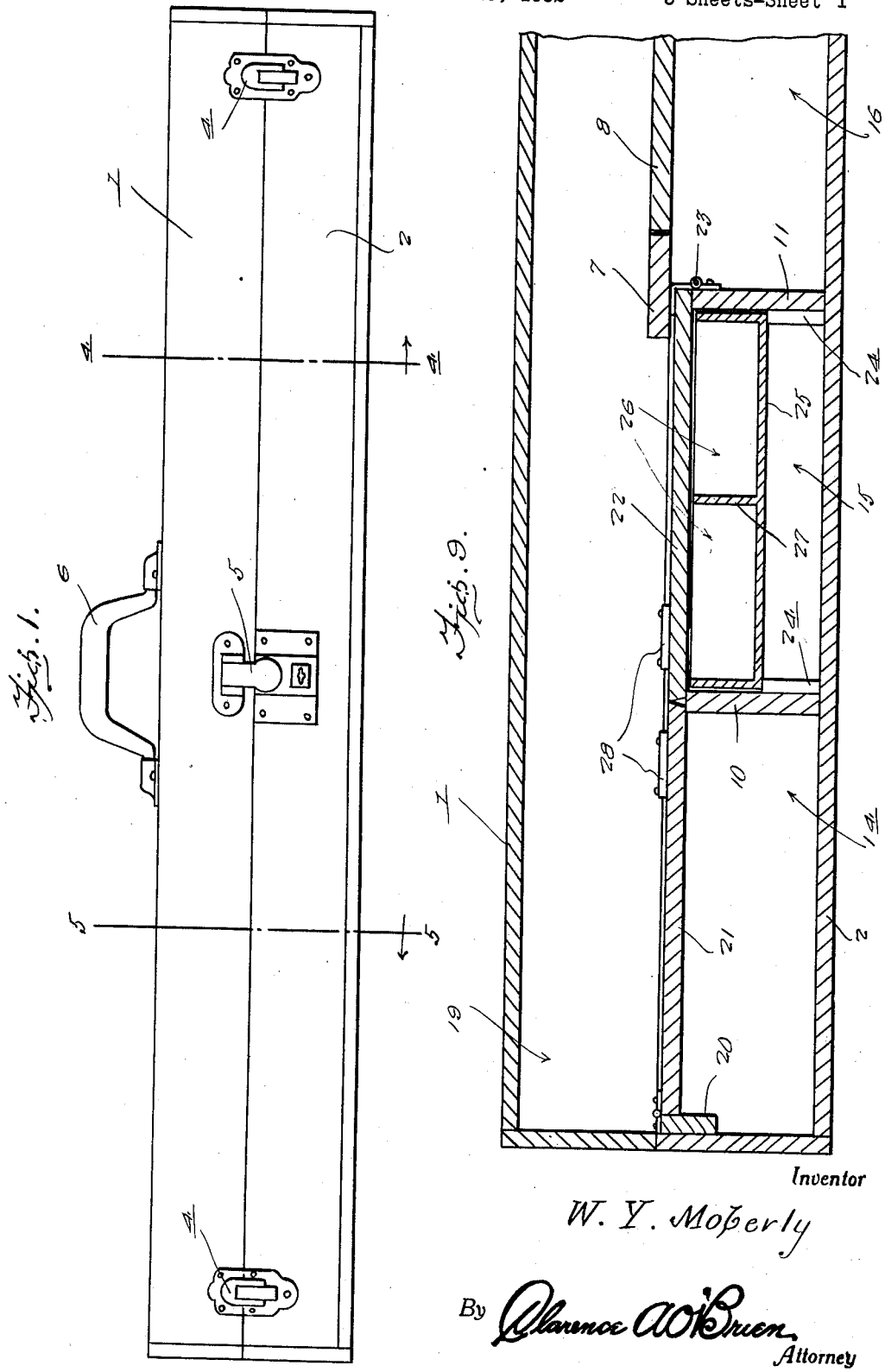

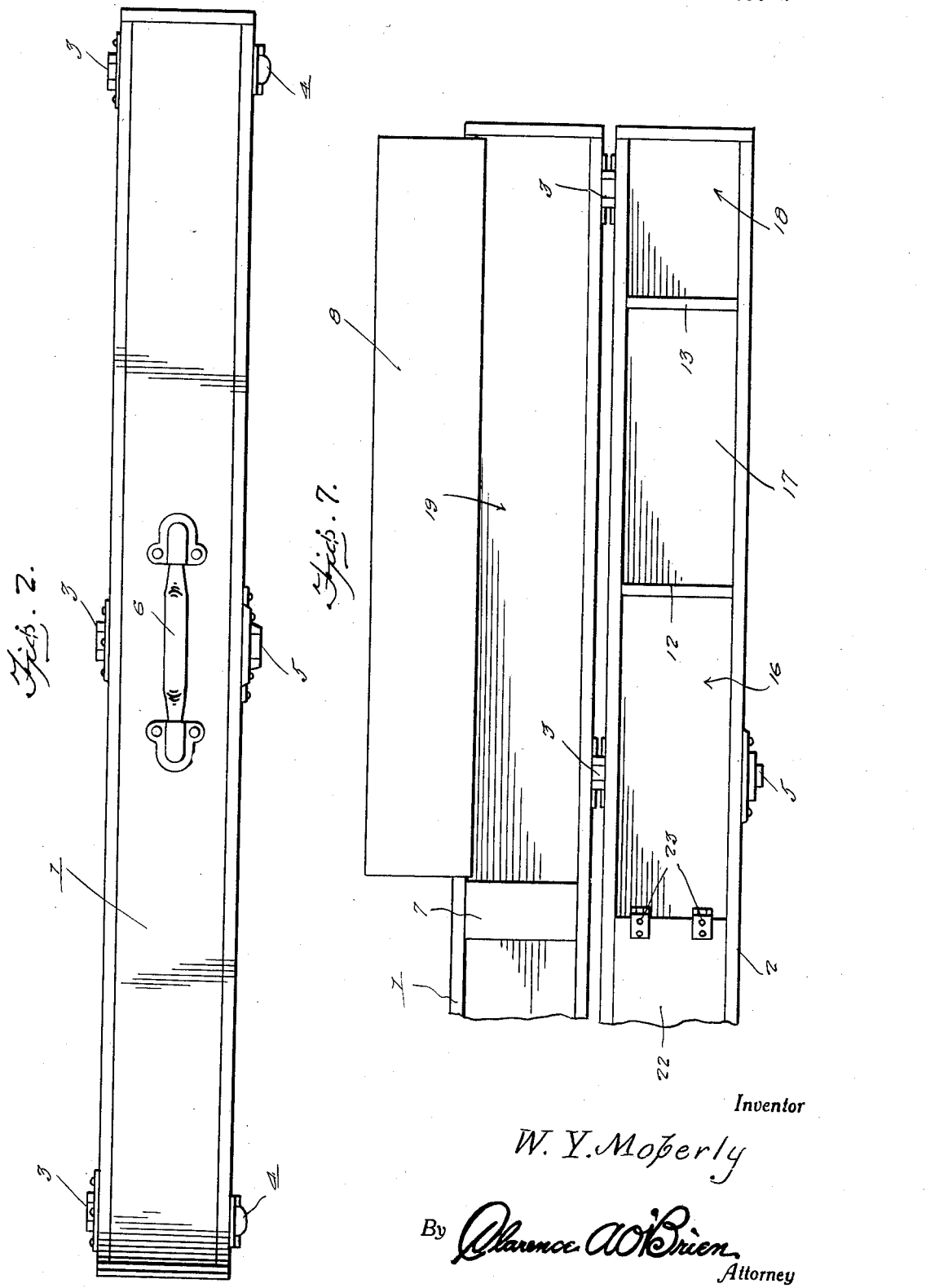

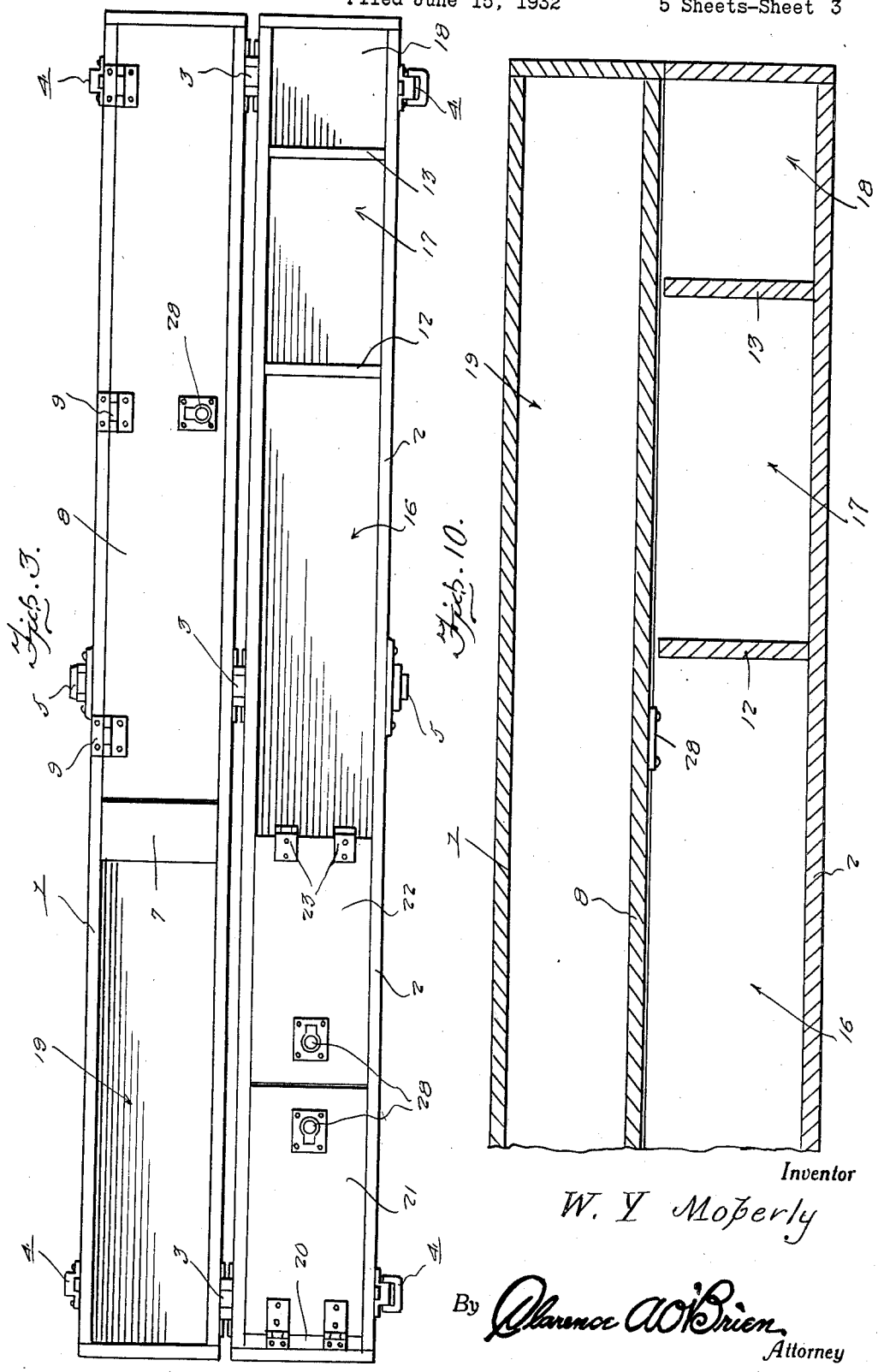

1,926,162

UNITED STATES PATENT OFFICE 1,926,162

FISHING TACKLE BOX

Waldo Y. Moberly, Sweet Grass, Mont.

Application June 15, 1932. Serial No. 617,463

2 Claims. (Cl. 217—7)

The present invention relates to new and useful improvements in fishing tackle boxes, and has for its primary object to provide, in a manner as hereinafter set forth, a box of this character embodying a novel construction, combination and arrangement of parts, through the medium of which various articles of equipment may be kept in compartments provided therefor and prevented from being mixed at all times regardless of how the box may be handled or positioned.

Other objects of the invention are to provide a fishing tackle box of the aforementioned character which will be simple in construction, strong, durable, efficient and reliable in use, compact, light in weight, attractive in appearance, and which may be manufactured at low cost.

All of the foregoing and still further objects and advantages of the invention will become apparent from a study of the following specification taken in connection with the accompanying drawings wherein like characters of reference designate corresponding parts throughout the several views, and wherein:—

Figure 1 is a view in front elevation, showing a fishing tackle box constructed in accordance with the present invention.

Fig. 2 is a view in top plan thereof.

Fig. 3 is a top plan view showing the tackle box opened.

Fig. 4 is a view in vertical transverse section taken substantially on the line 4—4 of Fig. 1.

Fig. 5 is a view in vertical transverse section taken substantially on the line 5—5 of Fig. 1, looking in the direction indicated by the arrow.

Fig. 6 is a fragmentary view in top plan of one end portion of the box in open position with the hinged closure members in said one end portion in open position.

Fig. 7 is a fragmentary view in top plan view of the other end portion of the box, showing said box in open position with the closure in the upper or top section opened.

Fig. 8 is a detail view in perspective of the tray which is removably mounted in one of the compartments of the lower section.

Fig. 9 is a fragmentary view in vertical longitudinal section through that end portion of the box which is illustrated in Fig. 6, said box being closed.

Fig. 10 is a fragmentary view in vertical longitudinal section thru that end portion of the box which is illustrated in Fig. 7, said box being closed.

Referring now to the drawings in detail, it will be seen that the embodiment of the invention as has been illustrated comprises upper and lower sections 1 and 2, respectively, which are hingedly connected together at the rear, as at 3. Suitable securing elements 4 and a lock 5 are provided on the front of the box for securing the sections together in closed position. Mounted on top of the upper section 1 is a carrying handle 6 which is positioned substantially centrally for proper balance. The sections 1 and 2 are elongated and may be of suitable dimensions and of any suitable material preferably plywood.

The lower section 2 is of slightly greater height than the upper section 1. By the reason of this arrangement, the upper section 1 will be supported by the handle 6 in a position substantially in the plane of the top of the lower section 2 when the box is in open position.

A brace 7 traverses the upper section 1 at an intermediate point. Extending between the brace 7 and one end of the upper section 1 is a closure 8 which is hingedly connected, as at 9, to the free side or front of said upper section 1. The closure 8, when in operative or closed position, fits snugly in the upper section 1, as illustrated to advantage in Fig. 4 of the drawings. Through the medium of the closure 8, a portion of the upper section 1 may be kept closed at all times, while the rest of said upper section 1 is left open.

Mounted transversely in the lower section 2 are vertical partitions 10, 11, 12 and 13 providing compartments 14, 15 and 16, 17, and 18. The compartment provided by the upper section 1 is designated by the reference numeral 19. A cleat 20 is secured to one end of the lower section 2 and hingedly connected at one end thereto is a longitudinally swinging door 21, the free end of which is engageable for rest on the partition 10, as best seen in Fig. 9 of the drawings. An oppositely disposed closure 22 is hingedly mounted at one end, as at 23, on the partition 11 and is also engageable at its free end for rest on the partition 10. The partitions 10 and 11 have their upper edges spaced below the top of the lower section 2 sufficiently to dispose the closures 21 and 22 slightly below the top of said lower section. When the upper section 1 is in closed position, the brace 7 extends over the hinged end portion of the closure 22. It will thus be seen that the closures 21 and 22, in the addition to providing means for closing the compartments 14, and 15, provide closing means for that portion of the compartment 19 in the upper section 1 which is not closed by the closure 8. Further, the closure 8 provides closing means for that portion of the lower section 2 which is free of the closures 21 and 22 which, it will be noted comprises the compartments 16, 17 and 18.

The upper edges of the partitions 12 and 13 are nearly flush with the top of the lower section 2 as seen in Fig. 10 of the drawings.

Vertical supports 24 are fixed in the corner portions of the compartment 15 for supporting in raised position a removable tray 25. The tray 25 is divided into compartments 26 by partitions 27. Suitable handles 28 are provided on closures 8, 21 and 22 to facilitate opening said closures.

The compartment 19 which extends the length of the upper section 1 is particularly intended for the reception of elongated articles of equipment, such as poles, rods, landing nets, etc. Various articles may be kept in the compartments 14 to 18 inclusive in the lower section 2. The compartments in the removable tray 25 are intended for the reception of small tackle. Any suitable number of compartments may be provided in the lower section 1.

It is believed that the many advantages of a fishing tackle box constructed in accordance with the present invention will be readily understood, and although the preferred embodiment of the invention is as illustrated and described, it is to be understood that changes in the details of construction, and in the combination and arrangement of parts may be resorted to which will fall within the scope of the invention as claimed.

Having thus described my invention, what I claim as new is:—

1. A box comprising a pair of hingedly connected sections constituting storage chambers open on confronting faces, a hinged closure on one section covering an end portion of one open face, vertical partition walls anchored to the other section dividing the chamber into separate compartments, hinged closures on said other section at the alternate end from the closure on the first mentioned section, and the hinged closures at said alternate end entirely covering certain of said compartments.

2. A box comprising a pair of hingedly connected sections constituting storage chambers open on confronting faces, a hinged closure on one section covering an end portion of one open face, vertical partition walls anchored to the other section dividing the chamber into separate compartments, hinged closures on said other section at the alternate end from the closure on the first mentioned section, and the hinged closures at said alternate end entirely covering certain of said compartments, and ledges anchored in one of said compartments adapted for supporting a tray.

WALDO Y. MOBERLY.